US012801000B2

(12) United States Patent
Huang et al.

(10) Patent No.: US 12,801,000 B2
(45) Date of Patent: Nov. 17, 2026

(54) DUST-PROOF STRUCTURE AND PROJECTION DEVICE

(71) Applicant: Coretronic Corporation, Hsin-Chu (TW)

(72) Inventors: Shou-Cheng Huang, Hsin-Chu (TW); Sheng-Yu Chiu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 153 days.

(21) Appl. No.: 18/985,054

(22) Filed: Dec. 18, 2024

(65) Prior Publication Data

US 2025/0216756 A1 Jul. 3, 2025

Related U.S. Application Data

(60) Provisional application No. 63/615,803, filed on Dec. 29, 2023.

(30) Foreign Application Priority Data

Mar. 20, 2024 (CN) ......................... 202410318168.0

(51) Int. Cl.
*G03B 21/20* (2006.01)
*G03B 21/14* (2006.01)

(52) U.S. Cl.
CPC ......... *G03B 21/145* (2013.01); *G03B 21/208* (2013.01)

(58) Field of Classification Search
CPC ............................ G03B 21/208; G03B 21/145
See application file for complete search history.

(56) References Cited

U.S. PATENT DOCUMENTS 10,108,074 B1 * 10/2018 Chen .................. G03B 21/2006
2002/0051122 A1 * 5/2002 Kakuta ................ G03B 21/145 353/98
2003/0053787 A1 * 3/2003 Lee ...................... G02B 6/0006 385/136
2003/0098956 A1 * 5/2003 Chang ...................... H05K 7/20 353/52

(Continued)

FOREIGN PATENT DOCUMENTS

CN 103869583 A 6/2014
TW 200951610 A 12/2009
TW I345125 B 7/2011

*Primary Examiner* — Bao-Luan Q Le

(57) ABSTRACT

A dust-proof structure applicable to an optical engine module of a projection device is provided. The optical engine module includes a base with a chamber, and the dust-proof structure includes a partition plate, a cavity structure, an adjustment hole, and an adjustment element. The partition plate is one part of the base and a side wall of the chamber. The cavity structure is disposed in the base, and the partition plate is located between the cavity structure and the chamber. The adjustment hole passes through the partition plate and the other part of the base and communicates with the chamber and the cavity structure. The adjustment element passes through the adjustment hole and partly corresponds to the cavity structure. The adjustment element is suitable for moving relative to the adjustment hole, such that debris generated during movement of the adjustment element is suitable for falling into the cavity structure.

20 Claims, 4 Drawing Sheets

(56) References Cited

U.S. PATENT DOCUMENTS

2004/0090598 A1* 5/2004 Morinaga ............ G03B 21/145 353/20
2005/0024601 A1* 2/2005 Morinaga .......... G03B 21/2046 353/87
2005/0111818 A1* 5/2005 Wang ................... G02B 6/4298 385/147
2006/0008228 A1* 1/2006 Kitamura ........... G02B 27/0994 385/136
2006/0092391 A1* 5/2006 Lin ...................... G03B 21/208 353/119
2006/0152689 A1* 7/2006 Oh ....................... G03B 21/208 348/E9.027
2007/0091285 A1* 4/2007 Teng .................... H04N 9/3141 353/121
2007/0109778 A1* 5/2007 Chang .................. G03B 21/208 362/220
2007/0121080 A1* 5/2007 Hsu ...................... G03B 21/208 353/52
2007/0216871 A1* 9/2007 Yoshikawa ............ G03B 21/16 353/30
2007/0216879 A1* 9/2007 Yoshikawa .......... G03B 21/145 353/99
2007/0263307 A1* 11/2007 Wu ........................ G02B 7/003 359/894
2008/0055749 A1* 3/2008 Liu ........................ G02B 7/023 359/822
2008/0079912 A1* 4/2008 Miwa ..................... G03B 21/14 359/811
2008/0080079 A1* 4/2008 Lu ...................... G02B 27/0994 359/894
2009/0015802 A1* 1/2009 Ho ....................... G03B 21/208 353/102
2009/0262315 A1* 10/2009 Tseng ..................... G03B 21/14 353/119
2009/0296051 A1* 12/2009 Huang ................. G03B 27/547 353/122
2014/0185022 A1* 7/2014 Chiu .................. G02B 27/0994 353/102
2016/0109786 A1* 4/2016 Yeh ...................... G03B 21/142 353/101
2016/0124294 A1* 5/2016 Yeh .......................... G02B 7/02 353/98
2016/0131966 A1* 5/2016 Matsuyama ....... G03B 21/2053 353/98
2018/0067386 A1* 3/2018 Dong ................... G03B 21/142
2018/0143515 A1* 5/2018 Cao ...................... G03B 21/142
2019/0094674 A1* 3/2019 Lu ........................ G03B 21/142
2019/0196307 A1* 6/2019 Cheng .................. G03B 21/142
2019/0196309 A1* 6/2019 Cheng .................. G03B 21/142
2019/0196319 A1* 6/2019 Cheng ................ G02B 27/0172
2019/0250401 A1* 8/2019 Chao .................... G03B 21/142
2019/0331996 A1* 10/2019 Hsu ...................... G03B 21/208
2022/0236632 A1* 7/2022 Chen .................... G03B 21/208

* cited by examiner

DUST-PROOF STRUCTURE AND PROJECTION DEVICE

CROSS-REFERENCE TO RELATED APPLICATION

This application claims the priority benefit of U.S. provisional application (No. 63/615,803), filed on Dec. 29, 2023, and China application (No. 202410318168.0), filed on Mar. 20, 2024. The entirety of the above-mentioned patent applications is hereby incorporated by reference herein and made a part of this specification.

TECHNICAL FIELD

The present disclosure relates to a projection device, and in particular, to a dust-proof structure and a projection device including such a dust-proof structure.

BACKGROUND

In a typical projection device, an optical engine includes an integration rod where the incident light can undergo multiple total reflections, resulting in a uniform distribution of the light exiting the rod. In the process of assembling the integration rod in the chamber of the optical engine, a manufacturing tolerances inherent at an assembled part of the integration rod or the optical engine or an assembly error during assembly is likely to cause the actual assembly position of the integration rod to deviate from an original default position. As a result, the light cannot be completely incident into the integration rod, leading to reduced brightness of the projection device.

For an integration rod that is skewed or deviated from the original default position, its position is adjusted by displacing a screw penetrating into the base of the optical engine and abutting against the integration rod. However, when the screw is rotated for displacement, it generates debris due to friction with the base of the optical engine. If this debris falls into the chamber where the integration rod is located and adheres to the integration rod or another optical element (such as a lens set) within the optical engine, it is likely to cause dirt or shadow on the projected image, even affecting the display brightness, thus resulting in poor quality of the image projected by the projection device.

The information disclosed in this "BACKGROUND" section is only for enhancement understanding of the background and therefore it may contain information that does not form the prior art that is already known to a person of ordinary skill in the art. Furthermore, the information disclosed in this "BACKGROUND" section does not mean that one or more problems to be solved by one or more embodiments of the disclosure were acknowledged by a person of ordinary skill in the art.

SUMMARY

The present disclosure provides a dust-proof structure and a projection device. The dust-proof structure is used to avoid debris falling into a chamber of an optical engine module where a light-homogenizing element is located, thus achieving the dust-proof function for the chamber.

Other advantages and objectives of the disclosure may be further illustrated by the technical features broadly embodied and described as follows.

To achieve one, some, or all of the foregoing objectives or another objective, the dust-proof structure in an embodiment of the present disclosure is applicable to the optical engine module of the projection device. The optical engine module includes a base with a chamber, and the dust-proof structure includes a partition plate, a cavity structure, an adjustment hole, and an adjustment element. The partition plate is one part of the base and a side wall of the chamber. The cavity structure is disposed in the base, and the partition plate is located between the cavity structure and the chamber. The adjustment hole passes through the partition plate and the other part of the base and communicates with the chamber and the cavity structure. A through direction of the adjustment hole is not parallel to an extension direction of the cavity structure. The adjustment element passes through the adjustment hole and partly corresponds to the cavity structure. The adjustment element is suitable for moving relative to the adjustment hole, such that debris generated during the movement of the adjustment element is suitable for falling into the cavity structure.

To achieve one, some, or all of the foregoing objectives or another objective, the projection device in an embodiment of the present disclosure includes a light source, an optical engine module, and a projection lens. The light source is suitable for providing a light beam. The optical engine module is disposed on a transmission path of the light beam from the light source, and the optical engine module includes a base, a dust-proof structure, a light-homogenizing element, and a light valve. The base has a chamber, and the light-homogenizing element is disposed in the chamber. The light-homogenizing element receives the light beam and outputs an illumination beam, the adjustment element abuts against the light-homogenizing element, and the adjustment element is suitable for moving and adjusting the position of the light-homogenizing element. The light valve is disposed on a transmission path of the illumination beam to convert the illumination beam into an image beam. The projection lens is disposed on a transmission path of the image beam to project the illumination beam out of the projection device.

The dust-proof structure in the embodiment of the present disclosure is provided with a cavity structure and an adjustment hole at the base of the optical engine module, and the adjustment hole communicates with the cavity structure. The cavity structure and the chamber where the light-homogenizing element is located are separated using a partition plate. A screw body of the adjustment element of the dust-proof structure is designed to have a non-thread section and a thread section. When the adjustment element is assembled in the adjustment hole, that is, when the thread section of the screw body is threaded with an internal thread of the adjustment hole, debris is generated and falls into the cavity structure as the adjustment element continuously moves toward the light-homogenizing element. And the non-thread section of the screw body does not generate debris when moving relative to the adjustment hole, such that the debris is not brought by the adjustment element into the chamber, thus achieving the dust-proof function for the chamber.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the disclosure may be practiced. In this regard, directional terminology, such as "top", "bottom", "front", "back", etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
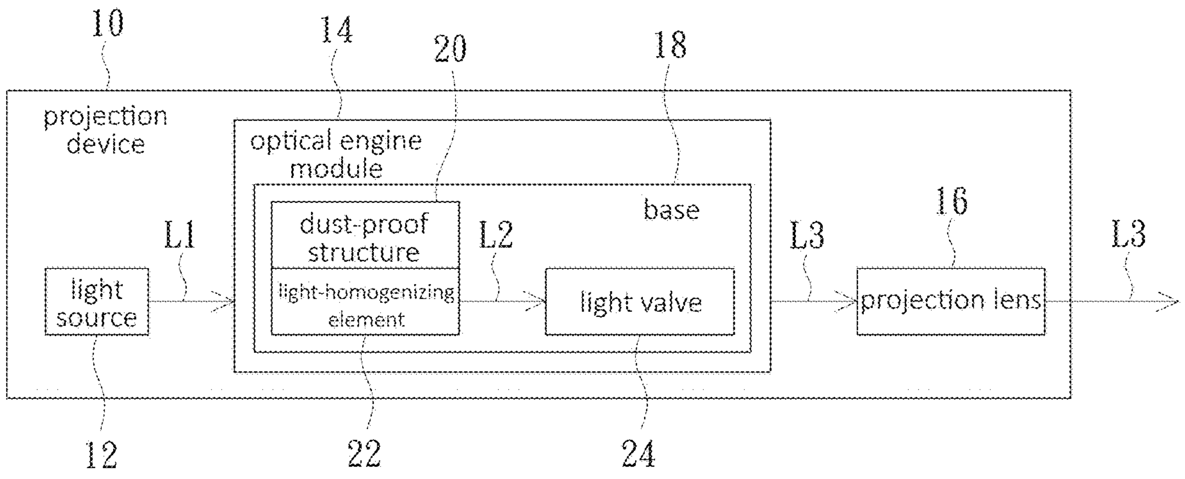
FIG. 1 is a schematic block diagram of a projection device according to an embodiment of the present disclosure.

FIG. 1 is a schematic block diagram of a projection device according to an embodiment of the present disclosure. As shown in FIG. 1, the projection device 10 includes a light source 12, an optical engine module 14, and a projection lens 16. The light source 12 is suitable for providing a light beam L1. The optical engine module 14 is disposed on a transmission path of the light beam L1 from the light source 12. The optical engine module 14 includes a base 18, a dust-proof structure 20, a light-homogenizing element 22, and a light valve 24. The light-homogenizing element 22 receives the light beam L1 and outputs an illumination beam L2. The light valve 24 is disposed on a transmission path of the illumination beam L2 to convert the illumination beam L2 into an image beam L3. In an embodiment, the light source 12 includes at least one of a combination of at least one laser diode and a wavelength conversion element (for example, a phosphor wheel), at least one light-emitting diode, and at least one laser diode. In an embodiment, the light beam L1 received by the light-homogenizing element 22 may serve as the illumination beam L2 to be transmitted to the light valve 24 in one timing sequence. The light-homogenizing element 22 may alternatively receive a light beam at another timing sequence, such as a conversion beam converted by a wavelength conversion element known to those skilled in the art. In an embodiment, after the conversion beam is output from the light-homogenizing element 22, it may also serve as the illumination beam L2 to be transmitted to the light valve 24, but this is not limited thereto. The term "light valve" as referred to in the present disclosure is widely used in the industry. Typically, it refers to any one of the spatial light modulators such as a digital micro-mirror device (DMD), a liquid-crystal-on-silicon panel (LCOS panel), or a transmissive liquid crystal panel. The light valve 24 is a type of spatial light modulator (SLM). A spatial light modulator contains many independent units that are spatially arranged in a one-dimensional or two-dimensional array. Each unit can independently accept control by an optical or electrical signal and use various physical effects (for example, the Pockels effect, Kerr effect, acousto-optic effect, magneto-optic effect, self-electro-optic effect of semiconductor, and photorefractive effect) to change its own optical properties. Thus, the illumination beam L2 on these independent units is modulated to output an image beam L3. The independent units are optical elements such as micro mirrors or liquid crystal units. The projection lens 16 is configured on a transmission path of the image beam L3 to project the image beam L3 out of the projection device 16 and form an image on a projection surface (not drawn).

Figure 2:
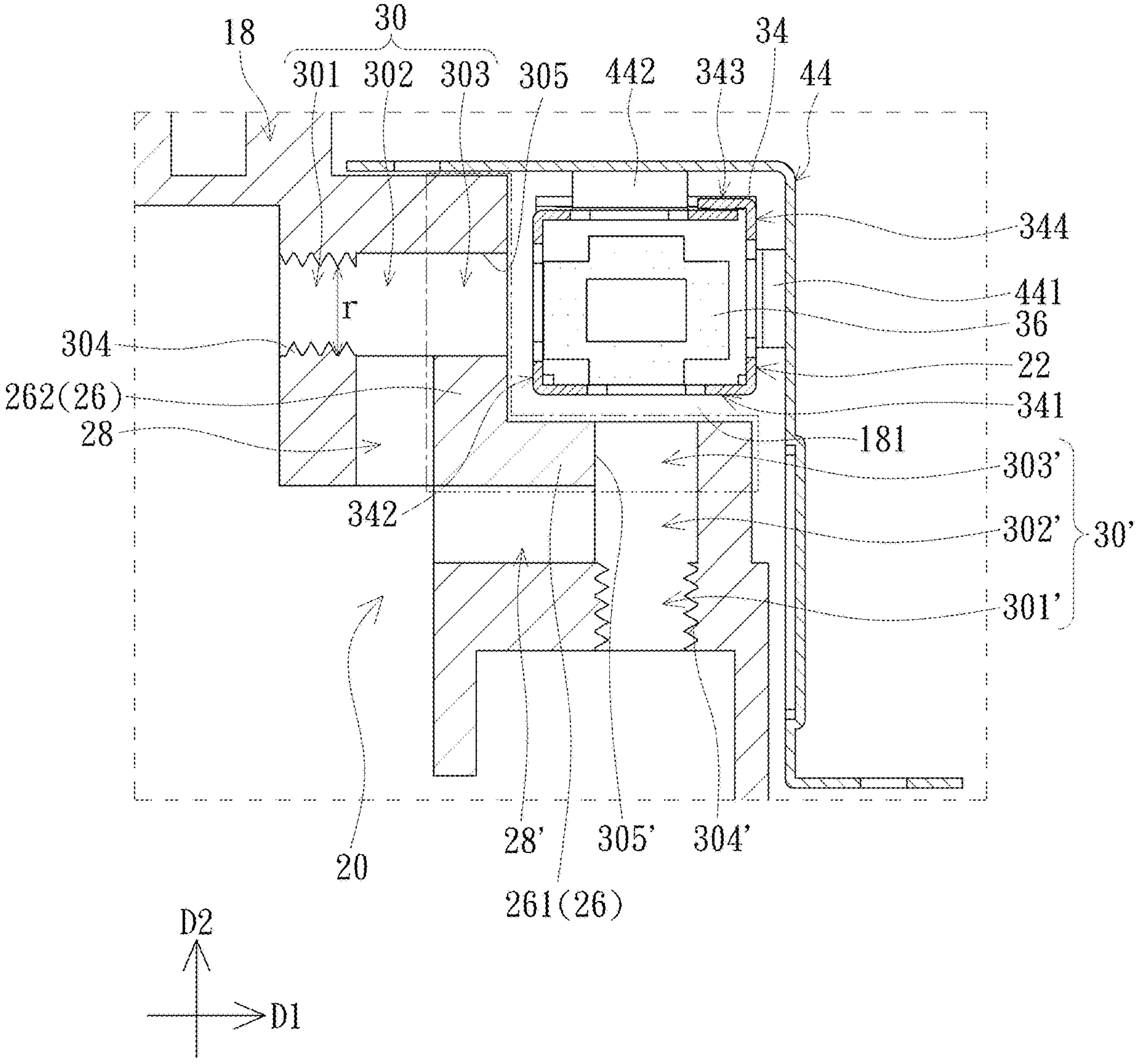
FIG. 2 is a schematic diagram of an arrangement of part of a base, a light-homogenizing element, and part of a dust-proof structure according to an embodiment of the present disclosure.
Figure 3:
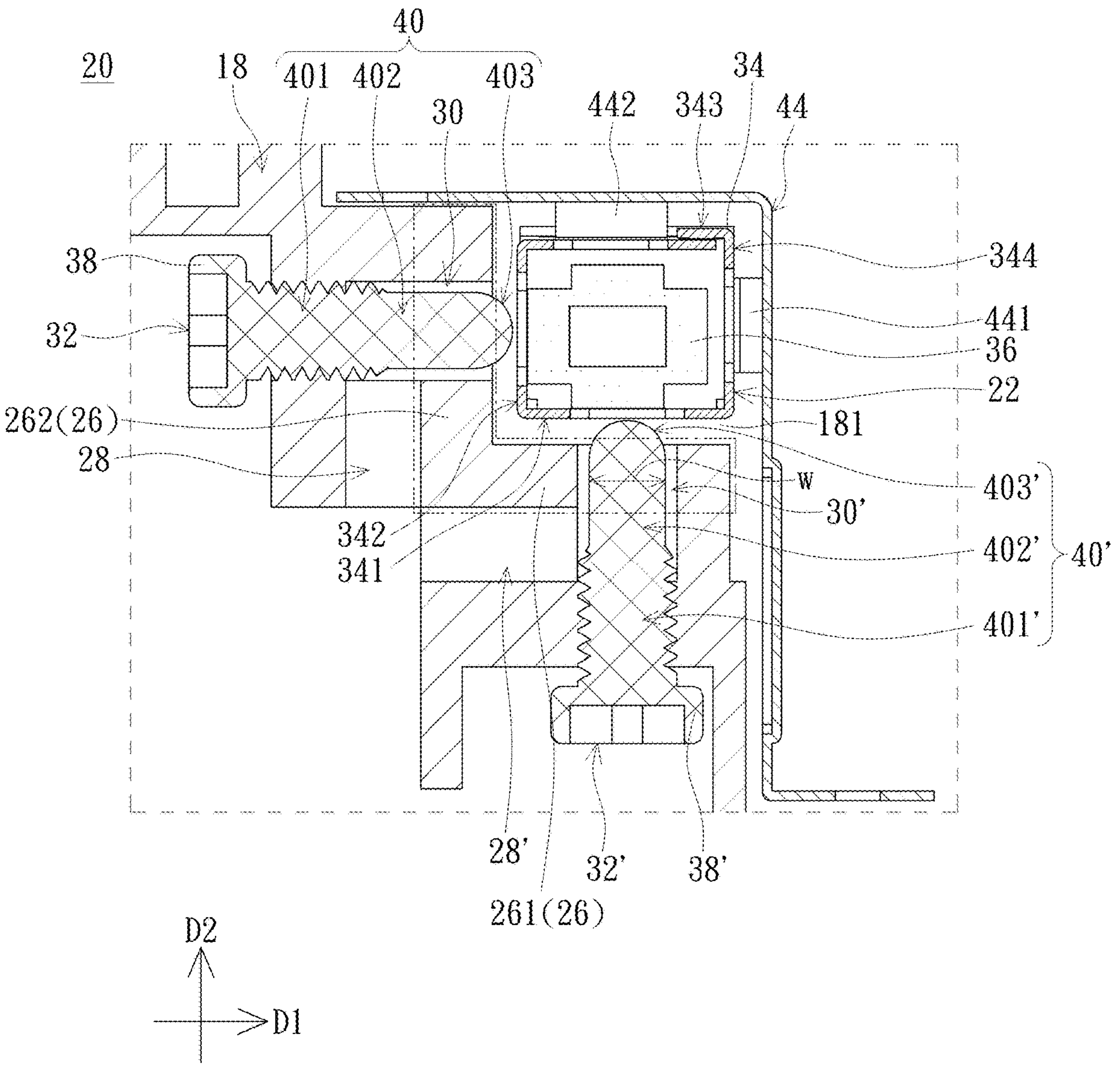
FIG. 3 is a schematic diagram of an arrangement of part of a base, a light-homogenizing element, and a dust-proof structure according to an embodiment of the present disclosure.

FIG. 2 is a schematic diagram of an arrangement of part of a base, a light-homogenizing element, and part of a dust-proof structure according to an embodiment of the present disclosure. FIG. 3 is a schematic diagram of an arrangement of part of a base, a light-homogenizing element, and a dust-proof structure according to an embodiment of the present disclosure. The difference between FIGS. 2 and 3 is that an adjustment element with a dust-proof structure is not drawn in FIG. 2 to facilitate the description of the technical features of the dust-proof structure 20 according to an embodiment of the present disclosure. As shown in FIGS. 2 and 3, the base 18 of the optical engine module 14 has a chamber 181, and the light-homogenizing element 22 is disposed in the chamber 181. In an embodiment, the base 18 may be, for example, one part of a housing of an optical engine module 14 (shown in FIG. 1) and/or the projection device 10 (shown in FIG. 1). The dust-proof structure 20 includes a partition plate 26, cavity structures 28, 28', adjustment holes 30, 30', and adjustment elements 32, 32'. The partition plate 26 is one part of the base 18 and a side wall of the chamber 181. The cavity structures 28, 28' are disposed in the base 18, and the partition plate 26 is located between the cavity structures 28, 28' and the chamber 181. The adjustment holes 30, 30' pass through the partition plate 26 and the other part of the base 18, the adjustment hole 30 communicates with the chamber 181 and the cavity structure 28, and the adjustment hole 30' communicates with the chamber 181 and the cavity structure 28'. A through direction of the adjustment hole 30 is not parallel to the extension direction of the cavity structure 28, and a through direction of the adjustment hole 30' is not parallel to an extension direction of the cavity structure 28' in corresponding communication therewith. As shown in FIG. 3, the adjustment elements 32, 32' respectively pass through the adjustment holes 30, 30' and are suitable for abutting against the light-homogenizing element 22. The adjustment elements 32, 32' partially correspond to the cavity structures 28, 28'. The adjustment elements 32, 32' are suitable for moving relative to the adjustment holes 30, 30' and abut against the light-homogenizing element 22 to adjust the position of the light-homogenizing element 22. The debris generated when the adjustment elements 32, 32' move is suitable for falling into the cavity structures 28, 28'.

The light-homogenizing element 22 includes a fixing base 34 and an integration rod 36, the integration rod 36 is accommodated and fixed in the fixing base 34, and the integration rod 36 receives the light beam L1 (marked in FIG. 1) and homogenizes the light beam L1. The cross section of the fixing base 34 is substantially rectangular, but not limited thereto. The fixing base 34 has a first surface 341 and a second surface 342, and the first surface 341 is connected to the second surface 342. The partition plate 26 includes a first portion 261 and a second portion 262, the first portion 261 is connected to the second portion 262, and the first portion 261 is not parallel to the second portion 262. The first surface 341 of the fixing base 34 faces the first portion 261, and the second surface 342 of the fixing base 34 faces the second portion 262. The first surface 341 and the second surface 342 are, for example, outer surfaces of the fixing base 34. In an embodiment, the first portion 261 and the second portion 262 are, for example, perpendicular. For example, the first portion 261 is arranged to be parallel to the first direction D1, and the second portion 262 is arranged to be parallel to the second direction D2.

In this embodiment, two adjustment holes 30, 30' are used as an example, but this is not limited thereto. The adjustment hole 30 extends along a first direction D1 and passes through the second portion 262 (that is, the through direction of the adjustment hole 30 is the first direction D1), and the other adjustment hole 30' extends along a second direction D2 and passes through the first portion 261 (that is, the through direction of the adjustment hole 30' is the second direction D2). Still referring to FIG. 2, the adjustment holes 30, 30' include first spaces 301, 301' corresponding to the other part of the base 18, second spaces 302, 302' corresponding to the cavity structures 28, 28', and third spaces 303, 303' corresponding to the partition plate 26. The second spaces 302, 302' are located between the first spaces 301, 301' and the third spaces 303, 303'. Specifically, the adjustment holes 30, 30' include the first spaces 301, 301', second spaces 302, 302', and third spaces 303, 303' that are connected sequentially. The first spaces 301, 301' correspond to a part of the base 18 that does not serve as the partition plate 26, the second spaces 302, 302' correspond to the cavity structures 28, 28', and the third spaces 303, 303' correspond to the partition plate 26. In an embodiment, inner walls of the first spaces 301, 301' of the adjustment holes 30, 30' have internal threads 304, 304', and inner walls of the third spaces 303, 303' of the adjustment holes 30, 30' are smooth surfaces 305, 305' and do not form internal threads 304, 304'.

In this embodiment, two cavity structures 28, 28' are provided to correspond to the quantity of the adjustment holes 30, 30', which is used as an example but is not limited thereto. The two cavity structures 28, 28' respectively communicate with the two adjustment holes 30, 30', and the two cavity structures 28, 28' can also communicate with each other. In an embodiment, one (the adjustment hole 30) of the two adjustment holes 30, 30' extending along the first direction D1 is perpendicular to an extension direction of one (the cavity structure 28) of the two cavity structures 28, 28', and the other one (the adjustment hole 30') of the two adjustment holes 30, 30' extending along the second direction D2 is perpendicular to an extension direction of the other one (the cavity structure 28') of the two cavity structures 28, 28'. In other words, the adjustment holes 30, 30' are connected to the cavity structures 28, 28' in corresponding communication therewith, for example, in a T-hole pattern. Specifically, the adjustment hole 30 extending along the first direction D1 is perpendicular to the extension direction of the cavity structure 28 in corresponding communication therewith, and the adjustment hole 30' extending along the second direction D2 is perpendicular to the extension direction of the cavity structure 28' in corresponding communication therewith.

Figure 4:
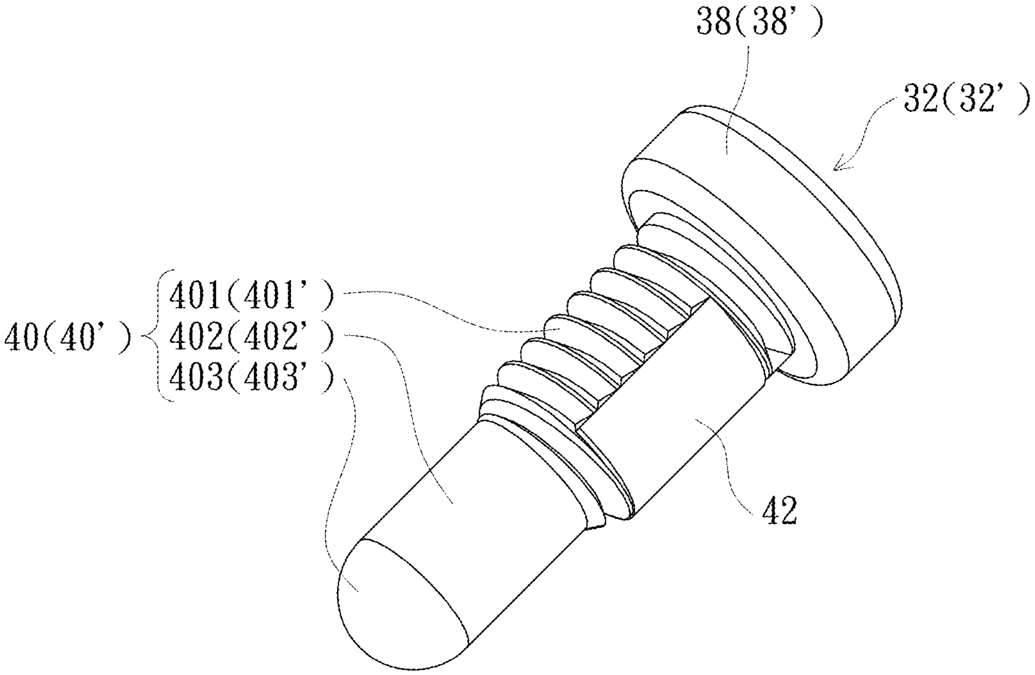
FIG. 4 is a schematic structural diagram of an adjustment element according to an embodiment of the present disclosure.

As shown in FIGS. 2 and 3, two adjustment elements 32, 32' are provided to correspond to the quantity of the adjustment holes 30, 30', which is used as an example, but is not limited thereto. FIG. 4 is a schematic structural diagram of an adjustment element according to an embodiment of the present disclosure. The adjustment elements 32, 32' are, for example, screws including screw heads 38, 38' and screw bodies 40, 40'. When the adjustment elements 32, 32' move relative to the adjustment holes 30, 30', ends 403, 403' of the screw bodies 40, 40' protrude from the adjustment holes 30, 30' and abut against the light-homogenizing element 22. In an embodiment, the adjustment element 32 passes through the adjustment hole 30 extending along the first direction D1 to abut against the second surface 342 of the fixing base 34 of the light-homogenizing element 22, and the adjustment element 32' passes through the adjustment hole 30' extending along the second direction D2 to abut against the first surface 341 of the fixing base 34 of the light-homogenizing element 22. The screw bodies 40, 40' include thread sections 401, 401' and non-thread sections 402, 402', the thread sections 401, 401' are adjacent to screw heads 38, 38', and with respect to the thread sections 401, 401', the non-thread sections 402, 402' are away from the screw heads 38, 38'. Referring to FIGS. 2, 3, and 4, parts of the thread sections 401, 401' of the screw bodies 40, 40' correspond to the internal threads 304, 304' of the first spaces 301, 301' of the adjustment holes 30, 30', the thread sections 401, 401' are threaded with internal threads 304, 304', and parts of the non-thread sections 402, 402' of the screw bodies 40, 40' correspond to smooth surfaces 305, 305' of the third spaces 303, 303' of the adjustment holes 30, 30'. In an embodiment, outer diameters w of the non-thread sections 402, 402' of the screw bodies 40, 40' are less than inner diameters r of the first spaces 301, 301' of the adjustment holes 30, 30'.

The debris generated when the adjustment elements 32, 32' pass through the first spaces 301, 301' of the adjustment holes 30, 30' having the internal threads 304, 304' is brought to the cavity structures 28, 28' in communication with the second spaces 302, 302' and falls into the cavity structures 28, 28' instead of entering the chamber 181 along with the adjustment elements 32, 32'. Because the third spaces 303, 303' of the adjustment holes 30, 30' do not have internal threads, the adjustment elements 32, 32' do not generate debris in the third spaces 303, 303', thus preventing the debris from entering the chamber 181.

Ends 403, 403' of the screw bodies 40, 40' abut against the light-homogenizing element 22 and are away from the thread sections 401, 401'. In an embodiment, the ends 403, 403' have curved contours. When the non-thread sections 402, 402' of the adjustment elements 32, 32' reach entrances of the third spaces 303, 303' of the adjustment holes 30, 30', the curved ends 403, 403' can be used for sliding to the entrances of the third spaces 303, 303' and correspond to the entrances of the third spaces 303, 303'. That is, cooperation between the curved ends 403, 403' and the entrances of the third spaces 303, 303' can enable a guide function to guide the non-thread sections 402, 402' of the screw bodies 40, 40' to enter the third spaces 303, 303', thus abutting against the light-homogenizing element 22. In this embodiment, as two adjustment elements in different directions abut against the light-homogenizing element 22, the position of the light-homogenizing element 22 can be fine-tuned, allowing the light-homogenizing element 22 to receive the light beam L1 accurately, and/or output the light beam L2 to the downstream optical element.

In an embodiment, as shown in FIG. 4, the adjustment elements 32, 32' may further include a locking adhesive layer 42 disposed at parts of the thread sections 401, 401'. The arrangement of the locking adhesive layer 42 can prevent the thread sections 401, 401' from loosening during locking with the internal threads 304, 304' of the first spaces 301, 301' (marked in FIG. 2) of the adjustment holes 30, 30'.

Referring to FIGS. 2 and 3, in an embodiment, the light-homogenizing element 22 may further include an elastic member 44, and the elastic member 44 includes a first elastic portion 441 and a second elastic portion 442. The fixing base 34 of the light-homogenizing element 22 further has a third surface 343 and a fourth surface 344, the third surface 343 is opposite the first surface 341, and the fourth surface 344 is opposite the second surface 342. The first elastic portion 441 abuts against the fourth surface 344, and the second elastic portion 442 abuts against the third surface 343. When it is intended to adjust the fixing base 34 to move in the first direction D1, the adjustment element 32 is moved in the first direction D1 and the fixing base 34 is pushed to move in the first direction D1. The first elastic portion 441 is squeezed by the fixing base 34 to be compressed, thus preventing the push of the adjustment element 32 from causing the fixing base 34 to directly collide with and damage the base 18. When it is intended to adjust the fixing base 34 to move in a direction opposite to the first direction D1, the adjustment element 32 is moved in the direction opposite to the first direction D1. The first elastic portion 441 generates an elastic restoring force due to the release of the squeeze pressure to the fixing base 34 and pushes the fixing base 34 to move in the direction opposite to the first direction D1 with the elastic restoring force.

Correspondingly, when it is intended to adjust the fixing base 34 to move in the second direction D2, the adjustment element 32' is moved in the second direction D2 and the fixing base 34 is pushed to move in the second direction D2. The second elastic portion 442 is squeezed by the fixing base 34 to be compressed, thus preventing the push of the adjustment element 32' from causing the fixing base 34 to directly collide with and damage the base 18. When it is intended to adjust the fixing base 34 to move in a direction opposite to the second direction D2, the adjustment element 32' is moved in the direction opposite to the second direction D2. The second elastic portion 442 generates an elastic restoring force due to the release of the squeeze pressure to the fixing base 34 and pushes the fixing base 34 to move in the direction opposite to the second direction D2 with the elastic restoring force.

In the projection device of the embodiments of the present disclosure, the base of the optical engine module is provided with a cavity structure, the dust-proof structure includes the partition plate, the adjustment element, the adjustment hole, and the cavity structure, and the partition plate is located between the cavity structure and the chamber where the light-homogenizing element is located. And, because the screw body of the adjustment element of the dust-proof structure includes the non-thread section and the thread section, when the adjustment element is assembled in the adjustment hole, that is, when the thread section of the screw body is threaded with an internal thread of the adjustment hole, debris is generated and falls into the cavity structure as the adjustment element continuously moves toward the light-homogenizing element. And the non-thread section of the screw body does not generate debris when moving relative to the adjustment hole, such that the debris is not brought by the adjustment element into the chamber, thus achieving the dust-proof function for the chamber. This in turn prevents dust or debris from adhering to the light-homogenizing element.

In summary, the dust-proof structure of the embodiment of the present disclosure can avoid the debris generated by friction between the adjustment element and the base falling into the chamber where the light-homogenizing element is located when the adjustment element is rotated for displacement to adjust the position of the integration rod of the light-homogenizing element, thus achieving the dust-proof function for the chamber. This can further prevent the debris from adhering to another optical element (for example, the lens set) in the optical engine module, so as to avoid dirt or shadow on the projected image caused by the debris adhering to the lens, which otherwise affects the display brightness, thus having a good display effect.

The foregoing description of the preferred embodiment of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term “the disclosure” is not necessary limited the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use “first”, “second”, etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A dust-proof structure applicable to an optical engine module of a projection device, wherein the optical engine module comprises a base with a chamber, and the dust-proof structure comprises a partition plate, at least one cavity structure, at least one adjustment hole, and at least one adjustment element, wherein:

the partition plate is a part of the base and at least one side wall of the chamber;

the at least one cavity structure is disposed in the base, and the partition plate is located between the at least one cavity structure and the chamber;

the at least one adjustment hole passes through the partition plate and the other part of the base, the at least one adjustment hole communicates with the chamber and the at least one cavity structure, and a through direction of the at least one adjustment hole is not parallel to an extension direction of the at least one cavity structure; and the at least one adjustment element is disposed to pass through the at least one adjustment hole, at least one part of the at least one adjustment element corresponds to the at least one cavity structure, the at least one adjustment element is configured to move relative to the at least one adjustment hole, and debris generated during movement of the at least one adjustment element is configured to fall into the at least one cavity structure.

2. The dust-proof structure according to claim 1, wherein the at least one adjustment hole comprises a first space corresponding to the other part of the base, a second space corresponding to the at least one cavity structure, and a third space corresponding to the partition plate, and the second space is located between the first space and the third space.

3. The dust-proof structure according to claim 2, wherein an inner wall of the at least one adjustment hole in the first space has an internal thread, and an inner wall of the at least one adjustment hole in the third space is a smooth surface.

4. The dust-proof structure according to claim 1, wherein the partition plate comprises a first portion and a second portion, the first portion is connected to the second portion, the first portion is not parallel to the second portion, a quantity of the at least one adjustment hole is two, one of the two adjustment holes extends along a first direction and passes through the second portion, and the other one of the two adjustment holes extends along a second direction and passes through the first portion.

5. The dust-proof structure according to claim 4, wherein a quantity of the at least one cavity structure is two, the two cavity structures respectively communicate with the two adjustment holes, and the two cavity structures communicate with each other.

6. The dust-proof structure according to claim 3, wherein the at least one adjustment element is a screw comprising a screw head and a screw body, and one end of the screw body protrudes from the at least one adjustment hole when the at least one adjustment element moves relative to the at least one adjustment hole.

7. The dust-proof structure according to claim 6, wherein the screw body comprises a thread section and a non-thread section, the thread section is adjacent to the screw head, and the non-thread section is away from the screw head, wherein at least one part of the thread section of the screw body corresponds to the internal thread of the at least one adjustment hole, the thread section is threaded with the internal thread, and at least one part of the non-thread section of the screw body corresponds to the smooth surface of the at least one adjustment hole.

8. The dust-proof structure according to claim 7, wherein an outer diameter of the non-thread section of the screw body is less than an inner diameter of the first space.

9. A projection device, comprising a light source, an optical engine module, and a projection lens, wherein:

the light source is configured to provide a light beam;

the optical engine module is disposed on a transmission path of the light beam from the light source, and the optical engine module comprises a base, a dust-proof structure, a light-homogenizing element, and a light valve, wherein:

the base has a chamber;

the dust-proof structure comprises a partition plate, at least one cavity structure, at least one adjustment hole, and at least one adjustment element, wherein:

the partition plate is a part of the base and at least one side wall of the chamber;

the at least one cavity structure is disposed in the base, and the partition plate is located between the at least one cavity structure and the chamber;

the at least one adjustment hole passes through the partition plate and the other part of the base, the at least one adjustment hole communicates with the chamber and the at least one cavity structure, and a through direction of the at least one adjustment hole is not parallel to an extension direction of the at least one cavity structure; and the at least one adjustment element passes through the at least one adjustment hole, at least one part of the at least one adjustment element corresponds to the at least one cavity structure, the at least one adjustment element is configured to move relative to the at least one adjustment hole, and debris generated during movement of the at least one adjustment element is configured to fall into the at least one cavity structure;

the light-homogenizing element is disposed in the chamber, receives the light beam, and outputs an illumination beam, the at least one adjustment element abuts against the light-homogenizing element, and the at least one adjustment element is configured to move to adjust a position of the light-homogenizing element; and the light valve is disposed on a transmission path of the illumination beam to convert the illumination beam to an image beam; and the projection lens is disposed on a transmission path of the image beam to project the image beam out of the projection device.

10. The projection device according to claim 9, wherein the at least one adjustment hole comprises a first space corresponding to the other part of the base, a second space corresponding to the at least one cavity structure, and a third space corresponding to the partition plate, and the second space is located between the first space and the third space.

11. The projection device according to claim 10, wherein an inner wall of the at least one adjustment hole in the first space has an internal thread, and an inner wall of the at least one adjustment hole in the third space is a smooth surface.

12. The projection device according to claim 11, wherein the at least one adjustment element is a screw comprising a screw head and a screw body, and one end of the screw body protrudes from the at least one adjustment hole to abut against the light-homogenizing element when the at least one adjustment element moves relative to the at least one adjustment hole.

13. The projection device according to claim 12, wherein the screw body comprises a thread section and a non-thread section, the thread section is adjacent to the screw head, and the non-thread section is away from the screw head, wherein at least one part of the thread section of the screw body corresponds to the internal thread of the at least one adjustment hole, the thread section is threaded with the internal thread, and at least one part of the non-thread section of the screw body corresponds to the smooth surface of the at least one adjustment hole.

14. The projection device according to claim 13, wherein an outer diameter of the non-thread section of the screw body is less than an inner diameter of the first space.

15. The projection device according to claim 13, wherein the end of the screw body abuts against the light-homogenizing element, is away from the thread section, and has a curved contour.

16. The projection device according to claim 13, wherein the at least one adjustment element further comprises a locking adhesive layer disposed at least one part of the thread section.

17. The projection device according to claim 9, wherein the light-homogenizing element comprises a fixing base and an integration rod, the integration rod is accommodated and fixed in the fixing base, the fixing base has a first surface and a second surface, the first surface is connected to the second surface, the partition plate comprises a first portion and a second portion, the first portion is connected to the second portion, the first portion is not parallel to the second portion, the first portion faces the first surface, and the second portion faces the second surface.

18. The projection device according to claim 17, wherein a quantity of the at least one adjustment hole is two, one of the two adjustment holes extends along a first direction and passes through the second portion, the other one of the two adjustment holes extends along a second direction and passes through the first portion, a quantity of the at least one adjustment element is two, and the two adjustment elements respectively pass through the two adjustment holes and abut against the first surface and the second surface of the fixing base.

19. The projection device according to claim 18, wherein a quantity of the at least one cavity structure is two, one of the two adjustment holes extending along the first direction is perpendicular to an extension direction of one of the two cavity structures, and the other one of the two adjustment holes extending along the second direction is perpendicular to an extension direction of the other one of the two cavity structures.

20. The projection device according to claim 19, wherein the two cavity structures respectively communicate with the two adjustment holes and the two cavity structures communicate with each other.

* * * * *